T. C. BAXTER.
Potato Fork.
No. 227,720. Patented May 18, 1880.
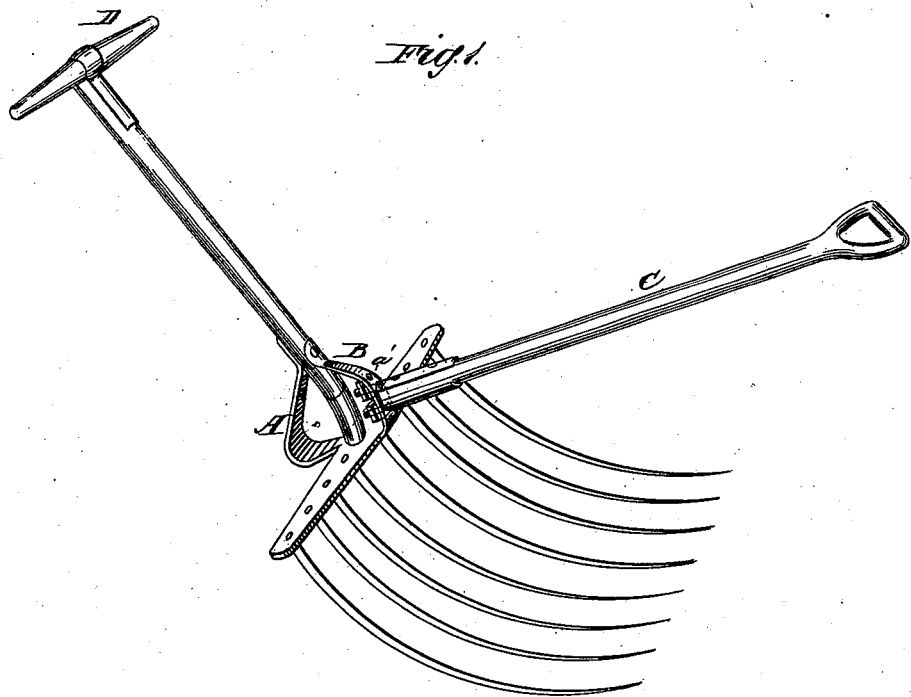
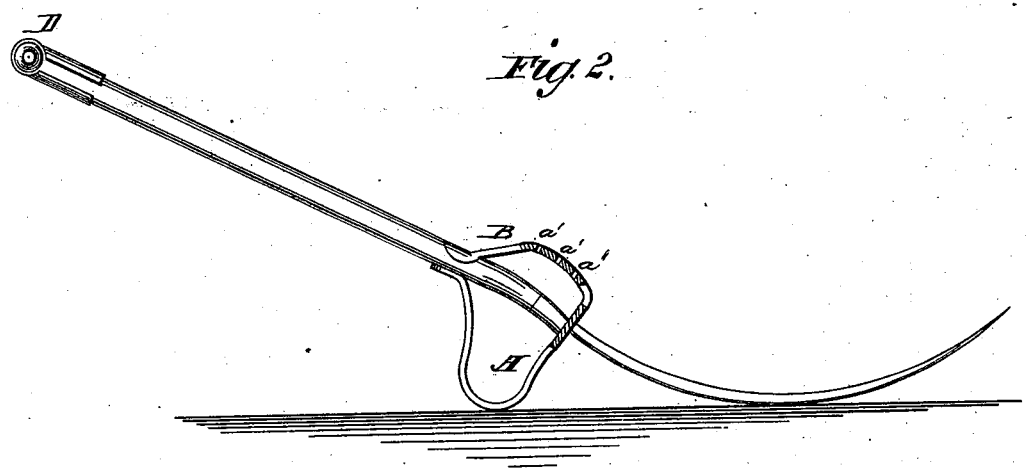
WITNESSES:
INVENTOR:
T. C. Baxter
BY Munn & Co.
ATTORNEYS.

UNITED STATES PATENT OFFICE.

TUBAL C. BAXTER, OF GLENWOOD, KANSAS.

POTATO-FORK.

SPECIFICATION forming part of Letters Patent No. 227,720, dated May 18, 1880.

Application filed January 28, 1880.

*To all whom it may concern:*

Be it known that I, TUBAL CAIN BAXTER, of Glenwood, in the county of Johnson and State of Kansas, have invented a new and Improved Potato-Fork, of which the following is a specification.

Figure 1 is a perspective view of the fork. Fig. 2 is a side view of the same.

Similar letters of reference indicate corresponding parts.

The object of this invention is to furnish an implement more efficient than a plow or an ordinary hoe or fork in removing potatoes from the hill.

To the rear of a fork of ordinary construction, excepting that it is broader and provided with long curved tines, is attached a foot-piece, A, that is bent outward and upward and secured upon the handle. A front piece, B, with bolt-holes $a'$ $a'$ in it, is in like manner secured to fork and handle. To this front piece the front handle, C, is attached by bolts and nuts, and it may be adjusted, it will be seen, in a higher or lower position to suit the person using it.

When used by two persons the fork is placed back of the hill and thrust beneath the potatoes by their combined action; then it is pulled and pushed forward and upward at the same time, lifting and dragging out all the potatoes from the hill. As the potatoes remain upon the fork, a shake or two given to it will separate them from the earth, which will fall between the tines.

When the fork is to be used by one man the handle C is removed and the fork is forced under the hill in the ordinary manner, but lifted forward by making use of the foot-piece A as a fulcrum, thus saving the otherwise great strain of lifting. When the potatoes are thus raised on the fork the fork will rest on the foot-piece, while the operator takes hold of the cross-handle D to aid him in shaking off the earth.

The use of this fork saves both time and labor over any other fork with which I am acquainted, and it will secure all the potatoes without cutting or marring them in the least.

The general custom is to dig with a hoe, small fork, or plow. The work with a hoe or small fork is tedious, and a great deal of time and labor are required to secure all the potatoes by these means, and besides many of them are cut and bruised by these implements.

It is estimated that in digging potatoes with a plow about one-fourth of them are lost or not gathered, or at least that enough are lost ordinarily to pay for gathering the entire crop.

This implement is made of sufficient length and breadth to go under an entire hill of potatoes and raise them, thus saving all the potatoes without cutting or bruising them, and saving, also, fully one-half the time over the old methods of digging.

I am aware that fulcrums and auxiliary handles have been heretofore used with potato-forks; but

What I claim is—

In combination with the handle and head of a potato-fork, a front piece, B, and auxiliary handle C, adjustably secured thereto, substantially as and for the purpose specified.

TUBAL CAIN BAXTER.

Witnesses:
THOMAS LINN HORNER,
JAMES D. ALLEN.